US007010840B2

(12) United States Patent
Reale

(10) Patent No.: US 7,010,840 B2
(45) Date of Patent: Mar. 14, 2006

(54) CYLINDER LINER REMOVER

(75) Inventor: Anthony Reale, Riverview, MI (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 10/653,150

(22) Filed: Sep. 3, 2003

(65) Prior Publication Data

US 2004/0049904 A1 Mar. 18, 2004

Related U.S. Application Data

(62) Division of application No. 10/120,383, filed on Apr. 12, 2002.

(51) Int. Cl.
*B23P 19/04* (2006.01)

(52) U.S. Cl. .......................................... 29/263; 29/255

(58) Field of Classification Search .................. 29/263, 29/255, 278, 267; 269/3, 6
See application file for complete search history.

(56) References Cited

U.S. PATENT DOCUMENTS 30,766 A * 11/1860 Sigrist ......................... 278/96
1,476,983 A * 12/1923 King ............................. 30/92
2,341,677 A 2/1944 Wass .......................... 29/88.2
2,421,324 A 5/1947 Graham ....................... 29/283
2,719,747 A * 10/1955 Layne ......................... 294/89
3,685,132 A 8/1972 Hodge ......................... 29/427
3,875,641 A 4/1975 Gregg ......................... 29/234
3,945,104 A 3/1976 Brookover, Jr. .............. 29/255
4,530,141 A 7/1985 Vachon ...................... 29/156.4
4,589,180 A 5/1986 Vachon ........................ 29/263
4,630,345 A 12/1986 Lutz ........................... 29/156
4,694,569 A 9/1987 Colvell et al. ................ 29/724
5,361,730 A 11/1994 Clark et al. .............. 123/41.81
5,572,920 A 11/1996 Kennedy et al. .............. 92/128
6,345,426 B1 2/2002 Collier ........................ 29/263
6,354,260 B1 3/2002 Newsom et al. ......... 123/193.5

OTHER PUBLICATIONS

Essential Tool Shipment—Detroit Diesel Corporation Series 50/60, "Cylinder Liner Remover" Patent Pending—J-45876; 3 pages, Jul. 11, 2002.

* cited by examiner

*Primary Examiner*—Lee D. Wilson
(74) *Attorney, Agent, or Firm*—Baker & Hostetler LLP

(57) ABSTRACT

A novel apparatus and method to engage a liner in an cylinder of an engine is provided. A wedge and rod are utilized as part of a liner remover assembly to move at least one collet axially to engage the liner. In a preferred embodiment, a novel eyehook is provided at an end of the rod to assist in the pulling of the liner from the cylinder.

17 Claims, 3 Drawing Sheets

CYLINDER LINER REMOVER

This application is a divisional application of U.S. patent application entitled, "CYLINDER LINER REMOVAL," filed Apr. 12, 2002, having a Ser. No. 10/120,383, the disclosure of which is hereby incorporated by reference in its entirety.

FIELD OF THE INVENTION

The present invention relates generally to an apparatus and a method to remove a liner. More particularly, the present invention relates to an apparatus and method to remove the liner from a cylinder of an engine.

BACKGROUND OF THE INVENTION

Conventional combustion, reciprocating engines are widely used as automotive engines. A conventional engine (single-cycle, two-cycle and others) is typically composed of an engine or cylinder assembly having one or more cylinders therein. A piston is slidably disposed in the cylinder and moves reciprocally within the cylinder. A cylinder head at one end of the cylinder closes the cylinder assembly. The cylinder head typically contains the valves (intake and exhaust) and the spark plug. A combustion chamber is defined by an inner wall of the cylinder, a top surface of the piston, along with the cylinder head.

During combustion, the piston moves reciprocally within the cylinder and eventually can wear down the inner walls of the cylinder. Cylindrical shaped liners have been developed to line the walls of the cylinder to increase the life of the cylinder. The liner may have coolant rings on its outer surface to form an annulus between the outer walls of the liner and the inner walls of the cylinder to provide a flow path for cooling liquid or air during combustion. When the liner is worn below a predetermined thickness, it can be replaced with another liner. However, over the course of the liner's life, the coolant rings may melt or other contaminants may harden and make it difficult to remove the liner by hand.

In order to remove a conventional liner, the cylinder head is removed from the cylinder assembly. A conventional liner remover is comprised of a cylindrically shaped rubber component that can be inserted into the liner and then compressed to expand and frictionally engage the liner to remove it from the cylinder. Because the components are rubber, the rubber tends to disintegrate over time or melts if the liner is still hot from a combustion event. Further, the rubber component can only be compressed to a certain point, thus it is limited to a certain diameter of liner and requires many liner removers to be on hand due to different sizes of liners in different engines. The liner can also become greasy due to contact with the fuel mixture or oil in the cylinder or the cooling rings around the liner can melt, thus making it difficult to remove the liner with the rubber components.

Therefore, there is a need for an apparatus and method to remove the liner that will not disintegrate over time, that can be adapted to any size liner, and can be expanded to better grip the liner.

SUMMARY OF THE INVENTION

Embodiments of the present invention generally provide for an improved method and liner removing assembly that can positively engage the liner and remove the liner from a cylinder of an engine.

In one embodiment, the liner removing apparatus can include a wedge coupled to a first end of a rod. At least one collet is provided and is capable of receiving at least a portion of the wedge and the rod. A plate can be coupled to the at least one collet and at least one nut. The at least one nut may be threadedly attached to the rod, which may have a lifting member mountable to a second end. Additionally, the apparatus can further include a first thrust bearing assembly that is at least partially enclosed by the plate and a retaining ring. A bridge that can support a second thrust bearing assembly is also provided, along with a second nut coupled to the second thrust bearing assembly. The apparatus can be made from a non-resilient material such as an alloy and can be selected from a group consisting of titanium, chromium, manganese, iron, nickel, copper, zinc, silver, tin, tungsten, platinum, gold, lead, steel, and a combination thereof. Additionally, the apparatus can be made from a polymer. Further, the at least one collet can have at least one flange at an end and can have at least one annular groove having at least one ring on its annular surface. The rod may be at least partially threaded along its outer surface. The lifting member can include an eyehook having at least one guiding member to guide a hook to a central portion and can be mounted by a pin received in the second end of the rod.

In a second embodiment, a liner remover assembly can include a wedge fastened to a first end of a rod, at least two or more collets forming a cavity capable of receiving at least partially the wedge and the rod, a plate coupled to the at least two or more collets and the rod, the plate at least partially enclosing a first thrust bearing assembly and a retainer ring, a first nut threaded to the rod, a bridge coupled to the rod, a second nut threaded to the rod, and a second thrust bearing assembly disposed between the second nut and the bridge. Additionally, the assembly can include a lifting member coupled to a second end of the rod. The at least two or more collets may have on its outer surface at least one annular groove to receive at least one ring and having at least one flange at an end. The assembly can be made from a non-resilient material such as an alloy and the alloy can be selected from a group consisting of titanium, chromium, manganese, iron, nickel, copper, zinc, silver, tin, tungsten, platinum, gold, lead, steel, and a combination thereof. The assembly can also be made from a polymer or a combination of alloy and polymer. Further, the lifting member may include an eyehook having at least one guiding member to guide a hook to a central portion of the eyehook.

A method of removing a liner from a cylinder in a combustible engine is also provided and can include inserting a liner removing assembly into the cylinder, the assembly comprising a wedge coupled to a first end of a rod and at least one collet to engage the liner, rotating a first nut to move the rod and the wedge in a first direction, engaging the liner by moving the at least one collet axially with the wedge, and rotating a second nut to move the liner from the cylinder. The method can also include lifting the liner removing assembly from the cylinder and removing the liner from the cylinder. The liner removing assembly preferably includes a plate at least partially enclosing a first thrust bearing assembly, a second thrust bearing assembly disposed between a bridge and the second nut, and a lifting member fastened to a second end of the rod.

A liner removing apparatus may include a means for supporting the liner removing apparatus, a means for gripping the liner in a cylinder, and a means for lifting the liner. Additionally, the means for supporting the liner removing apparatus can include a bridge. The means for gripping the liner may include a rod having a wedge at a first end, at least one collet capable of receiving at least partially the rod and the wedge, a first nut threaded to the rod and coupled to a plate, and a first thrust bearing assembly disposed at least partially in the plate. The means for lifting can preferably includes a second thrust bearing assembly disposed between a second nut and the bridge, the second nut threaded to the rod, and a lifting member coupled at a second end of the rod.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE INVENTION

Figure 1:
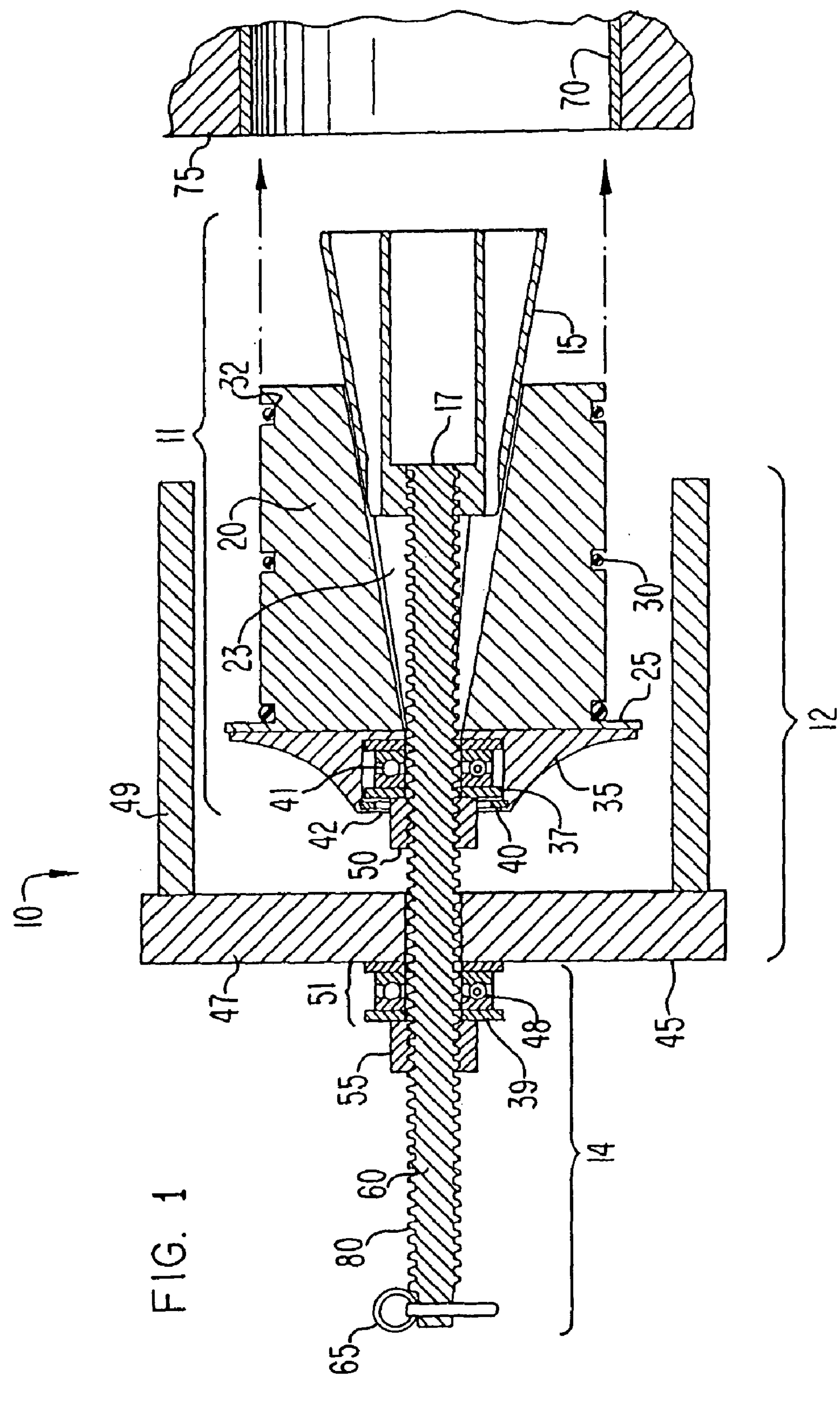
FIG. 1 is a cross-sectional view of one embodiment of a liner remover assembly.

FIG. 1 is a cross-sectional view of one embodiment of a liner remover assembly 10. The assembly 10 is shown having three major portions. The first portion or gripping portion 11 is designed to engage the liner 70 in a cylinder assembly 75 (partially shown). The second portion or the securing portion 12 helps place the assembly 10 over the cylinder assembly 75 and provides support during removal of the liner 70. The third portion or the removal portion 14 assists in the removal of the liner 70 from the cylinder assembly 75.

The gripping portion 11 can preferably include a conical shaped wedge 15, a rod 60, at least one collet 20, a plate 35, a first thrust bearing assembly 42, and a first nut 50. The wedge 15 can be any shape so long as it able to engage the liner 70 as required. The wedge 15 can preferably be made from a metal, an alloy such as titanium, chromium, manganese, iron, nickel, copper, zinc, silver, tin, tungsten, platinum, gold, lead, steel or similar materials. However, the wedge 15 may also be made from a polymer or a combination of polymers. The wedge 15 can be solid or at least partially hollowed (as shown) so long as it is strong enough to cause the collet 20 to engage the liner 70 as required. The wedge 15 can be threaded and/or welded at a first end 17 of the rod 60. The rod 60 has one or more threads on its outer surface. The collet 20 as used herein may be anything that has one surface that can mate with the liner 70 and another surface that can mate with the wedge 15. The collet 20 can be solid or at least partially hollowed so long as it is strong enough to engage the liner 70 as required. One or more collets 20 may be provided and can form a cavity 23 to receive the wedge 15 and the rod 60, however, preferably there are two collets 20, and more preferably there are four collets 20. The inner surface of the collet 20 and the outer surface of the wedge 15 are complementary to each other to provide maximum contact with each other. The collet 20 can preferably be made from a metal, an alloy such as titanium, chromium, manganese, iron, nickel, copper, zinc, silver, tin, tungsten, platinum, gold, lead, steel or similar materials. However, the collet 20 can also be made from a polymer or a combination of polymers that can engage and grip the liner 70. The collet 20 may have on the outer surface at least one or more annular grooves 32 to receive one or more rings 30. Rings 30 bind the collets 20 together until they are expanded radially by the wedge 15. A flange 25 is provided at one end of the collet 20 to mate with an upper surface of the cylinder assembly 75 and preferably allows the collet, the wedge 15 and a portion of the rod 60 to enter the liner 70.

The gripping portion 11 also includes the plate 35 that may be annularly shaped and can encapsulate the first nut 50 and the first thrust bearing assembly 42. The first thrust bearing assembly 42 can further include a retaining ring 40, and a first thrust bearing 41 that can be disposed between a first set of washers 37. The first thrust bearing assembly 42 may serve to decrease the friction between the plate 35 and the first nut 50, thereby making it easier to turn or torque the first nut 50. The plate 35 may be coupled to the collets 20 to prevent the collets from travelling in an axial direction when the first nut 50 is rotated in a first direction, thereby moving the wedge 15 and rod 60 in an axial direction. The plate 35 may be solid or may have apertures or slots therein for viewing into the cylinder 75. Additionally, the plate 35 may be any shape so long as it prevents the movement of the collets 20 axially when required. The first nut 50, the annular plate 35, and the first thrust bearing assembly 42 are threaded or coupled to the rod 60.

Figure 2:
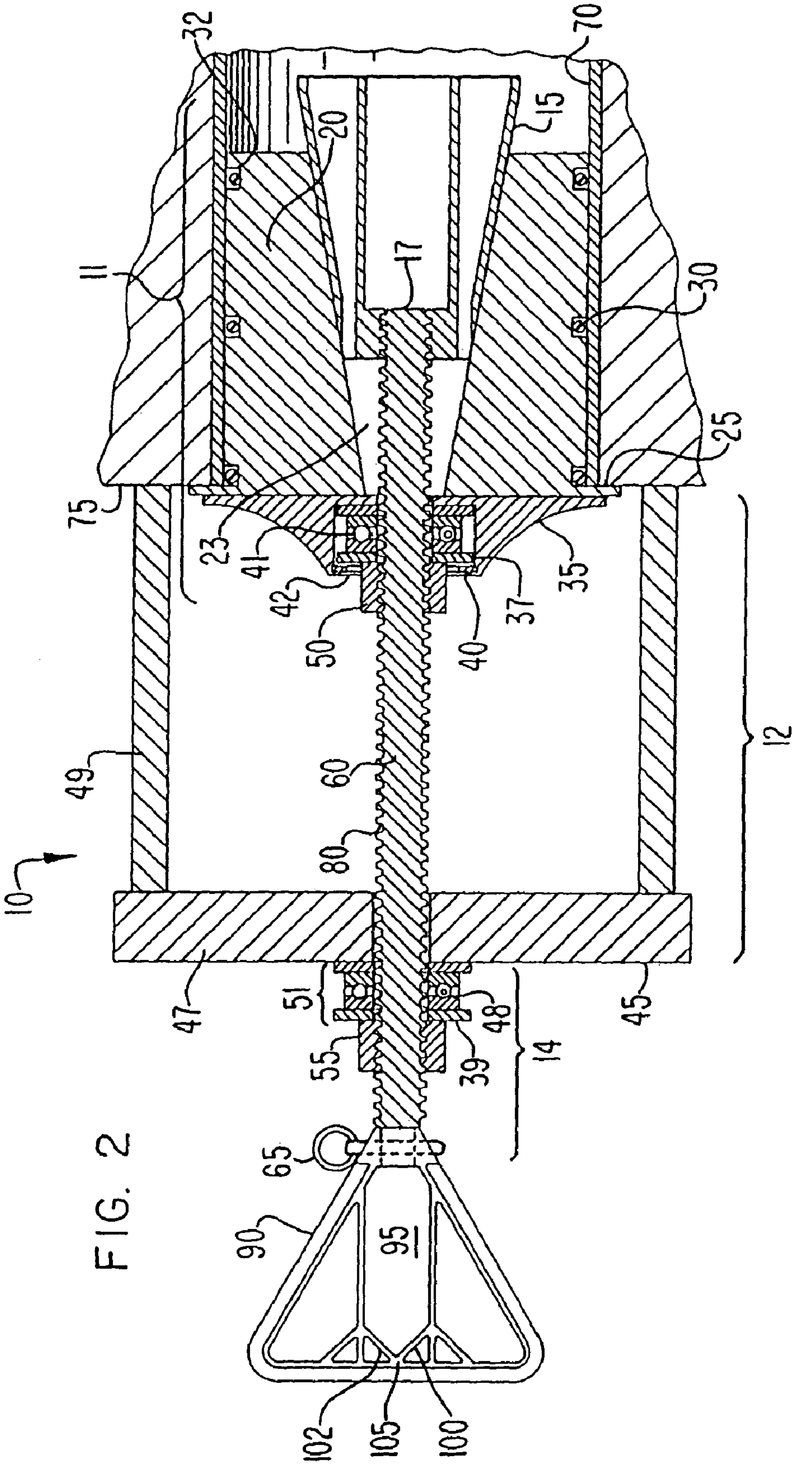
FIG. 2 is a cross-sectional view of the liner remover assembly engaging a liner from the cylinder.

In the gripping operation, a torquing apparatus such as a wrench, pliers or similar apparatus (not shown) torques (or turns) the first nut 50 in the first direction causing the first end 17 of rod 60 and the wedge 15 to move towards the first nut. This movement causes the wedge 15 to move further into the cavity 23 and forces the collets 20 radially outward to engage the liner 70 as shown in FIG. 2. The first nut 50 can be torqued in the first direction, as required, to force the collets 20 to expand radially and grip the liner 70. Additionally, the collets 20 can be expanded radially to fit various sizes of liners 70, thereby decreasing the number of liner remover assemblies 10 required to be available at the shop.

The securing portion 12 can include a bridge 45 that can be constructed and arranged to mate with an upper surface of the cylinder assembly 75. The bridge 45 may include a platform 47 and at least one supporting member 49, but preferably has two or more supporting members. The bridge 45 can provide the initial support for the assembly 10 when it is placed on the cylinder assembly 75. Additionally, the bridge 45 can assist in the removal of the liner 70 from the cylinder assembly 75 by providing support for a second nut 55 to rotate the rod 60 which lifts the gripping portion 11 and the liner 70. The bridge 45 can preferably be from a metal or an alloy such as titanium, chromium, manganese, iron, nickel, copper, zinc, silver, tin, tungsten, platinum, gold, lead, steel or similar materials. However, the bridge 45 can also be made from a polymer or a combination of polymers that are capable of withstanding the force required to lift the liner 70 from the cylinder assembly 75. Additionally, the bridge 45 and the support members 49 may be annular in shape or any other shape so long as it provides support as described above.

The removal portion 14 can include a second thrust bearing assembly 51, a second nut 55 and a second end 80 of the rod 60. The second thrust bearing assembly 51 may be positioned between the second nut 55 and the bridge 45, and can include a second set of washers 39 having a second thrust bearing 48 disposed between the washers. The second end 80 of rod 60 can be adapted to receive a lifting member such as an eyehook 90 (FIG. 2), which can be attached to a conventional hook and chain. The second end 80 can further include an aperture to receive a pin 65 therein. The pin 65 can secure the eye hook 90 to the rod 60. The eye hook 90 can be attached at all times or attached when it is needed such as to lift a heavy liner 70 or stuck liner that requires additional force. The second nut 55 and the second thrust bearing assembly 51 can be threaded or coupled to rod 60.

In the removal operation (FIG. 3), the torquing apparatus can be applied to the second nut 55 in the first direction, which rotates the rod 60, causing the gripping portion 11, and liner 70, to move axially towards the second nut. The torquing can continue until the liner 70 is removed at least partially from the cylinder assembly 75 or at a point where the liner can be removed by hand or other means.

FIG. 2 is a cross-section view of the liner remover assembly 10 engaging a liner 70 from the cylinder assembly 75. The liner remover assembly 10 is placed on an upper surface of the cylinder assembly 75 and the collets 20, wedge 15 and a portion of the rod 60 is inserted into the cylinder to engage the liner 70. The first nut 50 is torqued, thereby causing the rod 60 and the wedge 15 to move axially and forcing the collets 20 to move radially outward and engage the liner 70.

FIG. 2 also illustrates an alternative embodiment of the liner remover assembly 10 wherein a lifting member such as a handle or an eyehook 90 is attached to the second end 80 of the rod 60. The eye hook 90 is constructed and arranged for use with a hand or other devices such as a hook and chain. The eyehook 90 can include a central region 95 capable of receiving a hook (not shown) or similar devices. The central region 95 can be partially defined by a first guiding member 100 and a second guiding member 102 that converge at point 105. The guiding members 100, 102 can guide a hook to point 105 if the hook is initially placed on either guiding member 100, 102. By having the hook at point 105, the liner remover assembly 10 can be balanced and the liner 70 can be lifted with minimal swaying.

Figure 3:
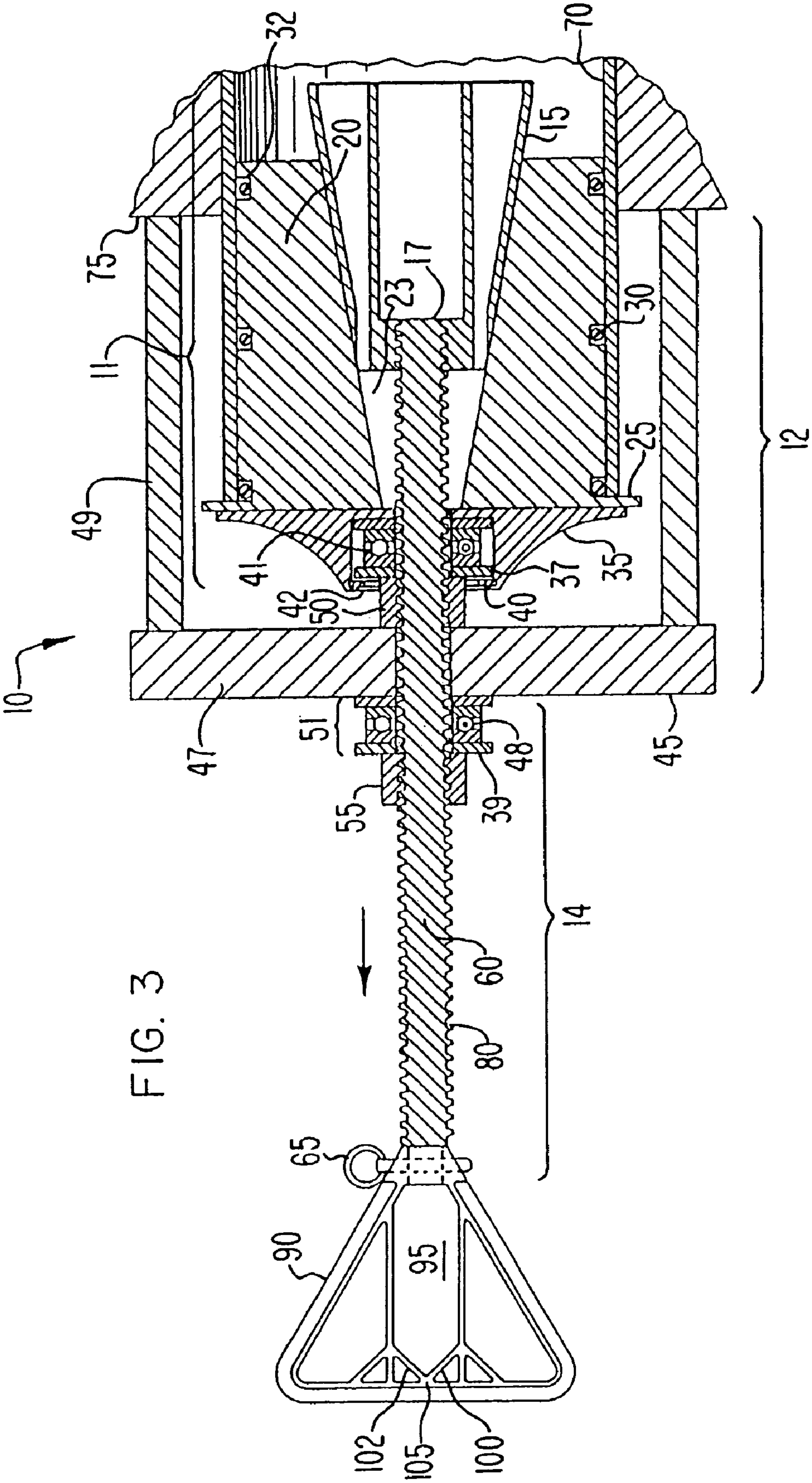
FIG. 3 illustrates the removal of the liner.

FIG. 3 illustrates the removal of the liner 70. The second nut 55 has been torqued by the torquing apparatus (not shown) causing the rod 60 to travel in the direction indicated by the arrow. Once the liner 70 is moved passed a certain point in the cylinder assembly 75, it can be easily removed. The collets 20 can be disengaged from the liner 70 by rotating the first nut 50 in a second direction, thereby allowing the liner to be removed by hand, pliers or similar devices. Alternatively, a hand (human) or hook can be used to grab the eyehook 90 and lift the entire liner remover assembly 10 along with the engaged liner 70 from the cylinder assembly 75. Additionally, all the components described above and herein can be made from a polymer, a metal or an alloy such as titanium, chromium, manganese, iron, nickel, copper, zinc, silver, tin, tungsten, platinum, gold, lead, steel or any combination thereof.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

The invention claimed is:

1. A liner removing apparatus for removing a liner from a cylinder, the apparatus comprising:

a wedge coupled to a first end of a rod;

at least one collet capable of receiving at least a portion of the wedge and the rod, the at least one collet having a first end for inserting into the cylinder through an opening defined by an upper surface of the cylinder, the at least one collet having a second end opposite the first, the second end including a flange engageable with the upper surface of the cylinder so as to limit insertion of the at least one collet into the cylinder;

a plate coupled to the at least one collet;

at least one nut threadedly coupled to the rod;

a lifting member mountable at a second end of the rod; and wherein the at least one collet has at least one annular groove having at least one ring on its annular surface.

2. The liner removing apparatus of claim 1, further comprising:

a first thrust bearing assembly at least partially enclosed by the plate and a retaining ring;

a bridge supporting a second thrust bearing assembly; and a second nut coupled to the second thrust bearing assembly.

3. The liner removing apparatus of claim 2, wherein the apparatus can be made from a non-resilient material such as an alloy, the alloy can be selected from a group consisting of titanium, chromium, manganese, iron, nickel, copper, zinc, silver, tin, tungsten, platinum, gold, lead, steel, and a combination thereof.

4. The liner removing apparatus of claim 2, wherein the apparatus can be made from at least one polymer.

5. The liner removing apparatus of claim 1, wherein the rod is at least partially threaded along its outer surface.

6. The liner removing apparatus of claim 1, wherein the lifting member comprises an eyehook having at least one guiding member to guide a hook to a central portion of the eyehook.

7. The liner removing apparatus of claim 1, wherein the lifting member is mounted by a pin that is received in the second end of the rod.

8. A liner remover assembly, comprising:

a wedge fastened to a first end of a rod;

at least two or more collets forming a cavity capable of receiving at least partially the wedge and the rod;

a plate coupled to the at least two or more collets and the rod, the plate at least partially enclosing a first thrust bearing assembly and a retaining ring;

a first nut threaded to the rod;

a bridge coupled to the rod;

a second nut threaded to the rod; and a second thrust bearing assembly disposed between the second nut and the bridge.

9. The liner remover assembly of claim 8, further comprising a lifting member coupled to a second end of the rod.

10. The liner remover assembly of claim 9, wherein assembly is made from a non-resilient material such as an alloy and the alloy is selected from a group consisting of titanium, chromium, manganese, iron, nickel, copper, zinc, silver, tin, tungsten, platinum, gold, lead, steel, and a combination thereof.

11. The liner remover assembly of claim 9, wherein the lifting member comprises an eyehook having at least one guiding member to guide a hook to a central portion of the eyehook.

12. The liner remover assembly of claim 9, wherein the assembly can be made from at least one polymer.

13. The liner remover assembly of claim 8, wherein the at least two or more collets having on an outer surface at least one annular groove to receive at least one ring and having at least one flange at an end.

14. A liner removing apparatus comprising:

means for supporting the liner removing apparatus;

means for gripping the liner in a cylinder, the means for gripping being insertable into the cylinder through an opening defined by an upper surface of the cylinder and including an engaging means for engaging the upper surface of the cylinder so as to limit insertion of the gripping means into the cylinder; and means for lifting the liner.

15. The apparatus of claim 14, wherein the means for supporting the liner removing apparatus is a bridge.

16. A liner removing apparatus comprising:

means for supporting the liner removing apparatus;

means for gripping the liner in a cylinder; and means for lifting the liner wherein the means for gripping the liner comprises:

a rod having a wedge at a first end;

at least one collet capable of receiving at least partially the rod and the wedge;

a first nut threaded to the rod and coupled to a plate; and a first thrust bearing assembly disposed at least partially in the plate.

17. A liner removing apparatus comprising:

means for supporting the liner removing apparatus;

means for gripping the liner in a cylinder; and means for lifting the liner wherein the means for lifting comprises:

a second thrust bearing assembly disposed between a second nut and the bridge, the second nut threaded to the rod; and a lifting member coupled at a second end of the rod.

* * * * *